United States Patent
Tong

[11] 3,864,209
[45] Feb. 4, 1975

[54] INLET FLOW OSCILLATION DAMPER FOR A NUCLEAR REACTOR

[75] Inventor: Long S. Tong, Pittsburgh, Pa.

[73] Assignee: Westinghouse Electric Corporation, Pittsburgh, Pa.

[22] Filed: Oct. 30, 1972

[21] Appl. No.: 302,327

Related U.S. Application Data

[63] Continuation of Ser. No. 30,499, April 21, 1970, abandoned.

[52] U.S. Cl. .................................. 176/50, 176/87
[51] Int. Cl. ............................................ C21c 15/24
[58] Field of Search ............ 176/50, 61, 87, 17, 18, 176/20

[56] References Cited
UNITED STATES PATENTS

| | | | |
|---|---|---|---|
| 3,205,146 | 9/1965 | Hackney et al. | 176/61 |
| 3,275,521 | 9/1966 | Schuderberg et al. | 176/61 |
| 3,357,890 | 12/1967 | Friis et al. | 176/87 |
| 3,575,807 | 4/1971 | Ripley | 176/20 |
| 3,623,948 | 11/1971 | Dotson et al. | 176/50 |
| 3,713,969 | 1/1973 | Cahill | 176/50 |

FOREIGN PATENTS OR APPLICATIONS

| | | | |
|---|---|---|---|
| 1,096,026 | 12/1967 | Great Britain | 176/61 |
| 1,253,830 | 11/1967 | Germany | 176/61 |

Primary Examiner—Harvey E. Behrend
Attorney, Agent, or Firm—J. R. Campbell

[57] ABSTRACT

The coolant flow entering through the inlet annulus of a liquid cooled nuclear reactor, formed by the cylindrical wall of the pressure vessel and the cylindrical wall of the core barrel supportedly suspended within the vessel, may be subject to oscillations due to vorticity imparted thereto. An inlet flow damper comprising a generally annular member constructed from one or more ring-like turning vanes situated adjacent the inlet nozzle functions to suppress such oscillations.

1 Claim, 5 Drawing Figures

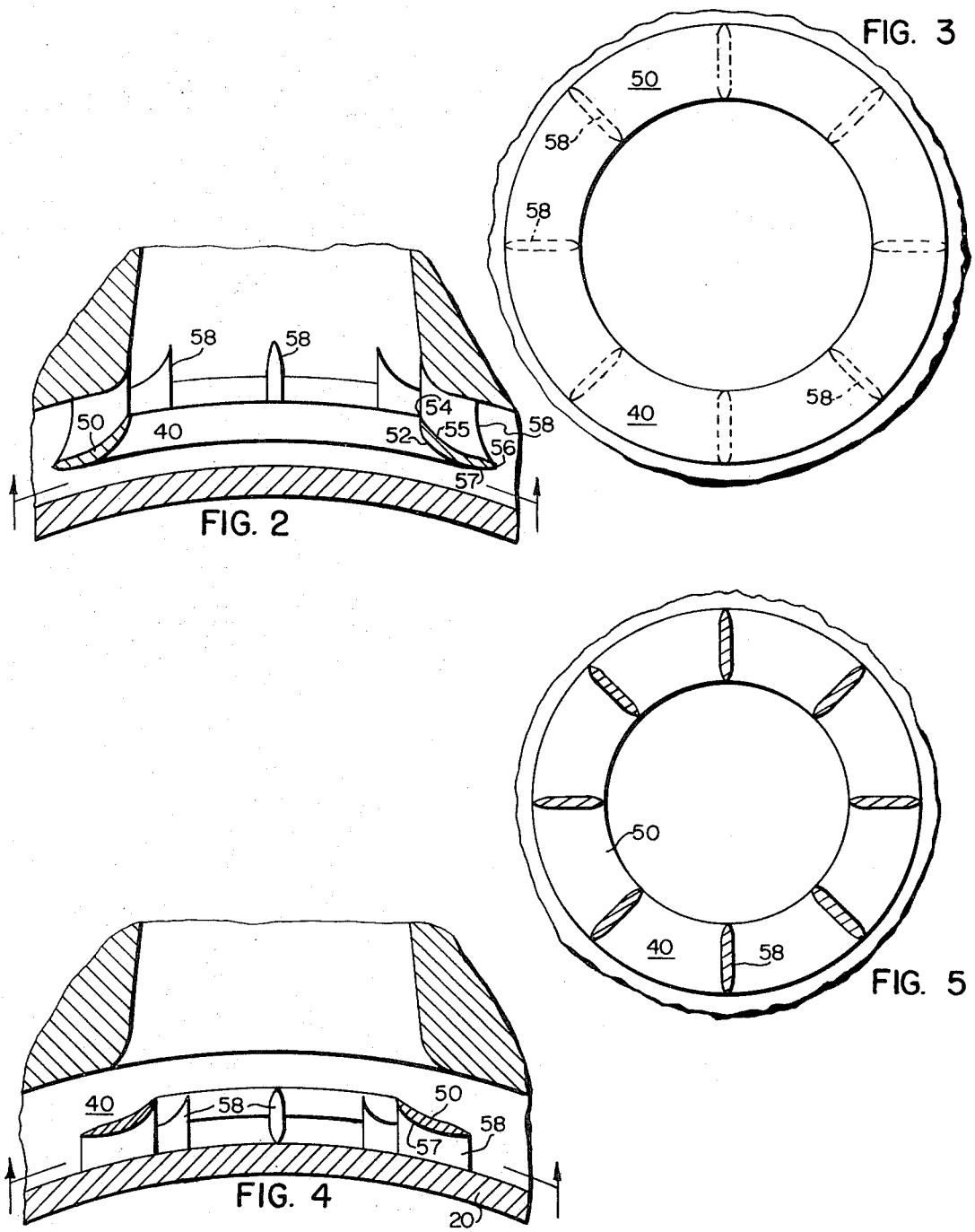

INLET FLOW OSCILLATION DAMPER FOR A NUCLEAR REACTOR

This is a continuation of application Ser. No. 30,499, filed Apr. 21, 1970, now abandoned.

BACKGROUND OF THE INVENTION

This invention pertains to means forming the coolant flow path through a liquid cooled nuclear reactor, and more particularly to an oscillation damper for the inlet flow into the reactor vessel.

Many liquid cooled nuclear reactors are constructed with the inlet and outlet nozzles near their upper ends. The coolant, which is most often water, proceeds into the nuclear reactor through one or more inlet nozzles opening into an inlet annulus, formed by the cylindrical wall of the pressure vessel and the cylindrical wall of the core barrel. The flow proceeds downwardly through the inlet annulus which opens into a lower coolant plenum. The flow generally proceeds from the lower plenum through the nuclear core of the reactor, which is generally formed from a plurality of fuel assemblies supported within the reactor, in an axial direction to an upper plenum from which the flow exits through an outlet nozzle, which extends through the pressure vessel and into the core barrel, to heat exchange means and other structure for converting the heat absorbed in the water to electrical energy.

The inlet and outlet nozzles generally enter the reactor pressure vessels perpendicularly to the wall of the vessel at the point of entry. For this reason, the flow must make an approximately 90° change in direction of the coolant flow imparts substantial vorticity thereto and causes oscillations in the annulus.

SUMMARY OF THE INVENTION

The aforementioned flow oscillations can be minimized in accordance with this invention by the provision of a generally annular member situated adjacent the inlet nozzle within the inlet annulus; which member is constructed from a one or more ring-like turning vanes which function to smoothly change the direction of the coolant flow entering the reactor vessel and thus to substantially eliminate vorticity which might otherwise be imparted thereto.

The inlet flow damper which functions as a vortex suppressor is constructed from one or more ring-like flow-turning vanes. The inner periphery of the vanes are angled toward the inlet nozzle and the inside diameter of the ring-like flow-turning vanes are preferably approximately equal to the inside diameter of the inlet nozzle. The flow-turning vanes are shaped to an edge on both their inner and outer periphery and may form a continuous curve. The ring-like vanes are connected by struts either onto the vessel or onto the core barrel.

The composite structure serves to turn the flow approximately 90° without causing vortices therein. Accordingly, the flow proceeds down the inlet annulus without having a substantial amount of energy imparted thereto, and flow oscillations in the inlet annulus are therefore subbstantially depressed.

DESCRIPTION OF THE DRAWINGS

For a better understanding of the invention reference may be had to the accompanying drawings of an exemplary embodiment, in which:

FIG. 2 shows an expanded plan view of the vortex suppressor;

FIG. 3 shows a view in elevation of same;

FIG. 4 shows a plan view of another embodiment of the vortex suppressor; and

FIG. 5 shows a view in elevation of same.

DESCRIPTION OF THE PREFERRED EMBODIMENT

Figure 1:
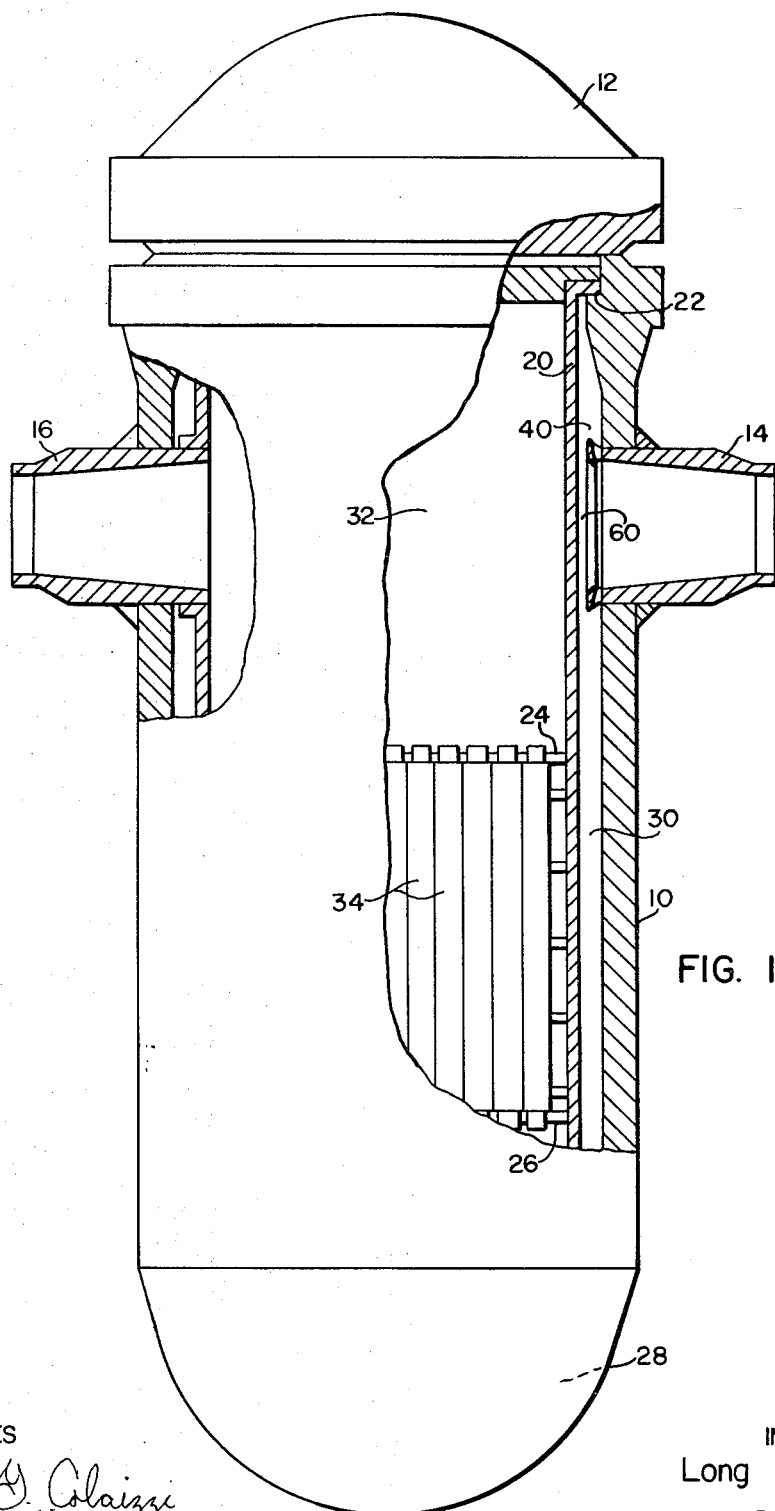
FIG. 1 shows a nuclear reactor having a vortex suppressor proximate inlet nozzle.

Referring to FIG. 1, there is illustrated a nuclear reactor incorporating the vortex suppressor of this invention. A pressure vessel 10 is shown which forms a tight pressurized container when enclosed with a head assembly 12 by suitable welds and head bolts (not shown). The pressure vessel 10 has a number of coolant flow inlet nozzles 14 and coolant flow outlet nozzles 16 projecting from a peripheral wall thereof. The head assembly 12 may be noted to have a plurality of head penetration adapters located in and through its substantially hemispherical wall in parallel alignment with the axis of the pressure vessel 10. A core barrel 20 is supportedly suspended from an inwardly extending projection 22 just below the top of the pressure vessel 10. An upper core plate 24 and a lower core plate 26 are located in and supported by the core barrel 20.

Coolant flow entering through inlet nozzle 14 proceeds to a bottom coolant manifold 28 through a flow inlet annulus 30 formed by the lower wall of the pressure vessel 10, which is preferably cylindrical, and the preferably cylindrical wall of the core barrel 20. From the bottom coolant manifold 28 the flow proceeding generally axially upward through the nuclear core located between the core plates 24 and 26 to an upper manifold region 32 from which it then proceeds through the outlet nozzles 16 and through conduits welded to the nozzle 16 to energy conversion structure (not shown). It should be noted that the coolant flow outlet nozzle 16 is extended through the pressure vessel 10 to openings in the core barrel to facilitate egress of coolant flow from the upper manifold 32.

the region between the upper core plate 24 and the lower core plate 26 is generally filled with a plurality of fuel assemblies 34; all of which are substantially identical. The parallel array of fuel assemblies 34 includes a plurality of fuel rods (not shown).

In accordance with this invention a vortex suppressor 40 may be welded or otherwise suitably affixed to the interior wall of the pressure vessel 10 proximate the inlet nozzle 14 and functions to smoothly turn the flow into the inlet annulus 30 and thus to suppress vorticity which would otherwise be imparted to the flow. The suppression of vorticity functions to minimize vibration in the inlet annulus 30.

The vortex suppressor 40 which can best be seen in the expanded views of FIGS. 2 and 3 is formed from one or more of ring-like flow-turning vanes 50. The flow-turning vanes 50 preferably have an inside diameter approximately equal to the inside diameter of the inlet nozzles 14. The vanes 50 are formed so that the portion adjacent their inner periphery, designated by the numeral 52, is bent or oriented at an angle toward the inlet nozzle 14. The portions adjacent both the inner and outer periphery of the vanes 50 are preferably formed to edges 54 and 56, respectively. The vanes 50 may be formed such that the inside and outside surfaces, 55 and 57 respectively, form continuous curves.

The vortex suppressor can be conveniently mounted on the core barrel 20 by welding. The vanes 50 of the suppressor 40 is preferably fitted with a plurality of struts 58 on their inside surfaces 55; whicch struts 58 are welded to the vanes 50 on one end and to the pressure vessel 10 on the other. Where more than one vane 50 is utilized, struts (not shown) may also be used to provide separation between the vanes 50.

Alternately as shown in FIGS. 4 and 5, the struts 58 may be welded to the vanes 50 on the outside surfaces 57. The vanes 50 could then be welded to the core barrel 20. The location of the vanes 50 would be approximately the same as in the depicted embodiment. In this embodiment, the inside diameter of the vane 50 may be smaller than the inside diameter of the inlet nozzles 14. In the first embodiment, this is not desirable since it would interfere with tests which are conducted periodically through the inlet nozzle 14.

Referring again to FIG. 1 it can be seen that flow entering through inlet nozzle 14 is smoothly turned by the vortex suppressor 40 and proceeds down the inlet annulus 30 having little energy imparted thereto by way of vorticity.

I claim:
1. A nuclear reactor comprising:
a reactor core enclosed in a core barrel;
a pressure vessel surrounding and spaced from said barrel the area therebetween defining a fluid coolant passageway of annular configuration;
at least one inlet nozzle extending through the pressure vessel into said annular passageway, and at least one outlet nozzle extending through the core barrel and pressure vessel for accommodating coolant flow from the inlet nozzle through the passageway and reactor core prior to being discharged from the outlet nozzle;
vortex suppressor means adjacent the discharge end of the inlet nozzle for minimizing pressure oscillations otherwise induced in the coolant by coolant flow vortexes after the coolant leaves the inlet nozzle;
said vortex suppressor means comprising an annular member supported on the inner walls of said pressure vessel by a plurality of struts, said vortex suppressor means being in axial alignment with the inlet nozzle and spaced from the core barrel said struts being positioned around said inlet nozzle and being of a size sufficient to space the leading edge of the annular member from the discharge end of the inlet nozzle; and
said annular member further having an inner diameter approximately the same as said inlet nozzle.

* * * * *